United States Patent [19]

Harra

[11] Patent Number: 4,622,752

[45] Date of Patent: Nov. 18, 1986

[54] GAUGE FOR MACHINE TOOLS

[76] Inventor: John Harra, 155 W. 81st St., Apt. 6L, New York, N.Y. 10024

[21] Appl. No.: 761,968

[22] Filed: Aug. 2, 1985

[51] Int. Cl.$^4$ .............................................. G01B 7/30
[52] U.S. Cl. .................... 33/185 R; 33/533; 33/535
[58] Field of Search ............ 33/185 R, 474, 475, 33/482, 533, 534, 535, 567; 340/678, 686

[56] References Cited

U.S. PATENT DOCUMENTS

| | | | |
|---|---|---|---|
| 1,040,715 | 10/1912 | Mann | 33/169 |
| 2,109,976 | 3/1938 | Pierce, Jr. | 177/311 |
| 2,417,148 | 3/1947 | Wright | 33/174 |
| 2,500,138 | 3/1950 | Poulton | 33/534 |
| 2,569,433 | 9/1951 | Highberg et al. | 33/533 |
| 3,012,330 | 12/1961 | Mendham | 33/535 |
| 3,247,599 | 4/1966 | O'Connor | 33/185 |
| 3,470,618 | 10/1969 | Richer | 33/169 |
| 3,499,226 | 3/1970 | Hopkins | 33/169 |
| 3,641,431 | 2/1972 | Pigage et al. | 324/61 R |
| 3,724,084 | 4/1973 | McNeece | 33/185 R |
| 3,903,609 | 9/1975 | Brown | 33/185 R |
| 3,969,713 | 7/1976 | Bossler, Jr. | 340/678 |
| 4,041,649 | 8/1977 | Stewart | 51/165.74 |
| 4,218,826 | 8/1980 | Duke | 33/185 R |
| 4,319,403 | 3/1982 | Stearns | 33/185 R |
| 4,383,369 | 5/1983 | Newton | 33/185 R |

Primary Examiner—Richard R. Stearns
Attorney, Agent, or Firm—Indyk, Pojunas & Brady

[57] ABSTRACT

A gauge for determining whether a conductive element, such as a cutting element, fence, gauge rod, gauge shaft, or guiding surface is oriented at a predetermined angle with respect to a reference surface is disclosed and claimed. The gauge includes an indicator, an electrical energy source, and at least one pair of contacts. When the gauge is placed on the reference surface, the contacts are abutted against the conductive element, and the conductive element is oriented at the predetermined angle, a series circuit is completed between the indicator and the energy source. As one example, the gauge can be used to ascertain the angle of a saw blade with respect to a saw table.

13 Claims, 5 Drawing Figures

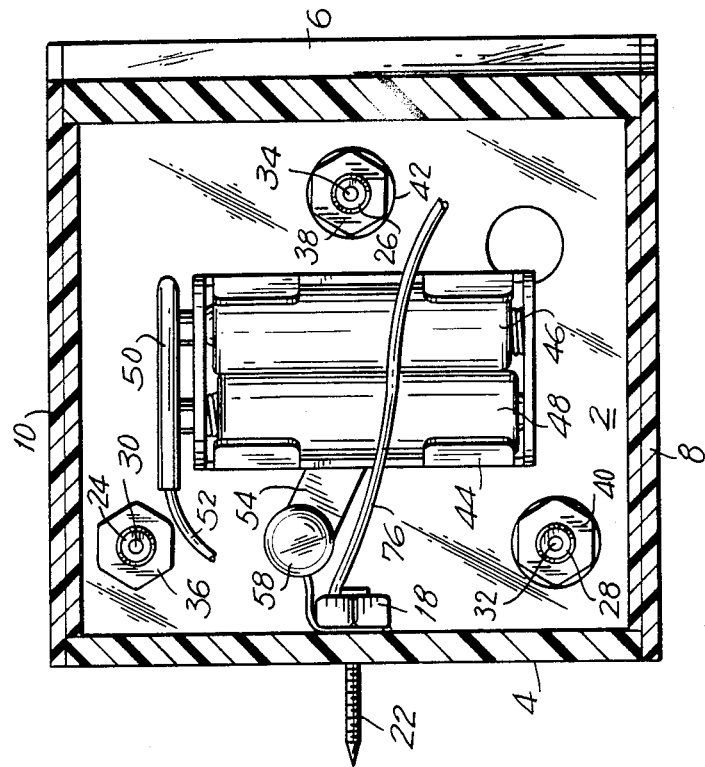
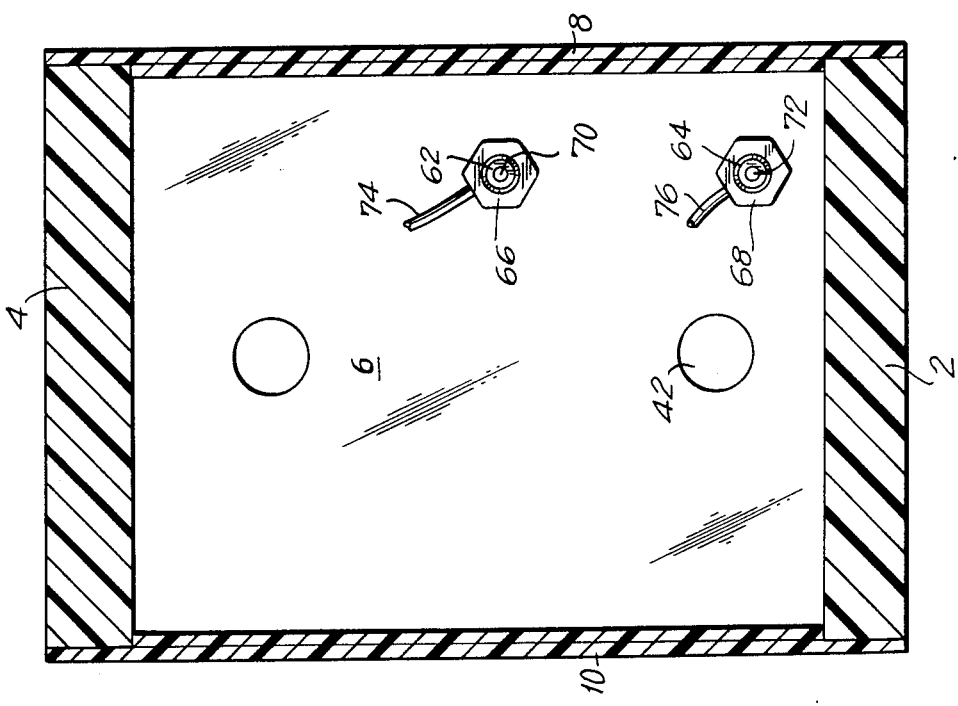

GAUGE FOR MACHINE TOOLS

BACKGROUND OF THE INVENTION

This invention relates to a gauge for a machine tool. More specifically, this invention relates to a gauge for determining whether a conductive element of the machine tool, such as a cutting element, fence, gauge rod, gauge shaft, or guiding surface, is positioned at a predetermined angle with respect to a reference surface on the machine tool.

Machine tools typically have a conductive element, such as a cutting element, fence, gauge rod, gauge shaft, or guiding surface, supported in a predetermined orientation with respect to a reference surface over which a work piece is guided toward a cutting element. As just one specific example of such a machine tool, a table saw comprises a circular conductive saw blade supported at a predetermined angle with respect to a saw table. A work piece is guided over the saw table towards the saw blade so that the work piece is cut at an angle determined by the angle between the saw blade and the saw table. This angle can be any almost angle, but usually it is either 90° or 45° to the surface of the saw table.

The angle between the conductive element and the reference surface typically is adjustable to enable one to return the cutting element to the predetermined angle when it deviates from the predetermined angle or to provide different cutting angles on the work piece. There is a need, therefore, to be able to accurately adjust the angle of the conductive element with respect to the reference surface and to verify that the angle is adjusted to the desired value.

Various approaches have been suggested in the past to accurately set and verify the angle of conductive elements with respect to reference surfaces. One approach is a visual inspection procedure involving the use of a machinist's square having two straight edges connected together at a right angle, or at any angle to which it is desired to adjust the cutting element. One of the edges of the square is placed on the reference surface and the other edge is placed against the conductive element. The operator then visually inspects the conductive element to ascertain if it is parallel to edge of the square placed against the conductive element. If not, the operator then knows that the conductive element is not at the prescribed angle. The conductive element then can be adjusted so that it properly is parallel to the edge of the square. This procedure is unsatisfactory because debris tends to collect on the square, the square tends to become deformed in heavy use, and great visual acuity and concentration are required to ascertain to great accuracy whether the conductive element is parallel to the square along the entire edge of the square.

McNeece U.S. Pat. No. 3,724,084 refers to a probe element for checking the alignment of a tool with respect to a work piece. The probe element has a plurality of electrically conductive elements positioned in a stacked array and separated by non-conductive members, each conductive element connected in series with an indicator. When the tool is placed against the conductive elements, the tool completes a conductive circuit between each of the indicators and a power source through the structure supporting the tool and the indicators. When the tool is in proper alignment, all of the indicators are lit. This arrangement is costly because of the number of indicators and conductive circuits required. This arrangement also can only be used with tools supported by conductive structures.

Newton U.S. Pat. No. 4,383,369 refers to a device for adjusting the working edges of a moveable head on mill and shop tools. This device has a housing enclosing a battery and has a number of spaced electrical contacts so arranged that an electrical circuit is completed through an indicator when one of the contacts engages a fixed location site on the tool and the other contact engages the working edge of the tool. The circuit thus is completed through the support for the cutting element. This arrangement is unsatisfactory because a plurality of measurements must be taken in order to ascertain the alignment of the working edge. Like the apparatus of the McNeece patent above, the device of the Newton patent requires that it be used with cutting elements having conductive supports.

This invention overcomes the foregoing problems of the prior art by the provision of the simple gauge for ascertaining and verifying in one operation the angle made by a conductive element with respect to a reference surface over which a work piece is guided in a predetermined alignment with respect to a cutting tool. This invention relates to a gauge which can be used with a wide variety of machine tools, including those not having conductive reference surfaces, such as radial arm saws and routers, which typically have tables constructed of non-conductive materials, such as wood or wood by-products.

SUMMARY OF THE INVENTION

It is an object of the invention to provide a gauge for determining whether a conductive element of a machine tool is oriented at one or more predetermined angles with respect to a reference surface over which a work piece is guided towards a cutting element. The conductive element can be the cutting element itself, or a fence, gauge rod, gauge shaft, or guiding surface on the machine tool.

It is a further object of the invention to provide a gauge which ascertains whether the angle of the conductive element is at the proper value in an easy, one-step operation.

It is further an object of the invention to provide a gauge which is simple and economical to construct.

It is a further object of the invention to provide a gauge with one simple series electrical circuit.

It is also an object of the invention to provide a gauge capable of indicating the angle of a conductive element with respect to a reference surface by means of a single series circuit of an indicator and an electrical energy source.

It is also an object of the invention to provide a gauge capable of indicating the angle of a conductive element with respect to a non-conductive reference surface.

It is also an object of the present invention to provide a gauge capable of indicating the angle with respect to a reference surface of a conductive element having non-conductive supports.

It is an additional object of this invention to provide a gauge for determining the angle of a conductive element with respect to a reference surface accurate to within about 0.0001 inches.

It is yet an additional object of this invention to provide a gauge which accurately determines whether the angle of a saw blade with respect to a saw table has a predetermined value, such as 90° or 45°.

In accordance with the above objects, the invention is a novel gauge for determining whether a conductive element is oriented at a predetermined angle with respect to a reference surface on a machine tool. The gauge comprises first and second contacts, an electrical energy source, and an indicator connected in a series circuit. The contacts are oriented with respect to each other such that the conductive element completes the series circuit when the gauge is placed on the reference surface, the contacts are abutted against the conductive element, and the conductive element is oriented at the predetermined angle. A housing supports the first and second contacts and encloses the indicator and electrical energy source. In a preferred embodiment, the gauge can have third and fourth contacts connected in series with the indicator and electrical energy source, the third and fourth contacts oriented such that the conductive element completes the series circuit of the third and fourth contacts, the indicator, and the electrical energy source when the gauge is placed on the reference surface, the third and fourth contacts are abutted against the conductive element, and the conductive element is oriented at a second predetermined angle with respect to a reference surface. Preferably, a means for leveling the gauge with respect to the reference surface is provided.

BRIEF DESCRIPTION OF THE DRAWINGS

FIG. 3 shows a sectional view of the gauge of the invention taken along line 3—3 in FIG. 2.

FIG. 4 shows a sectional view of the gauge in accordance with the present invention taken along line 4—4 in FIG. 2.

DETAILED DESCRIPTION OF THE INVENTION

Figure 2:
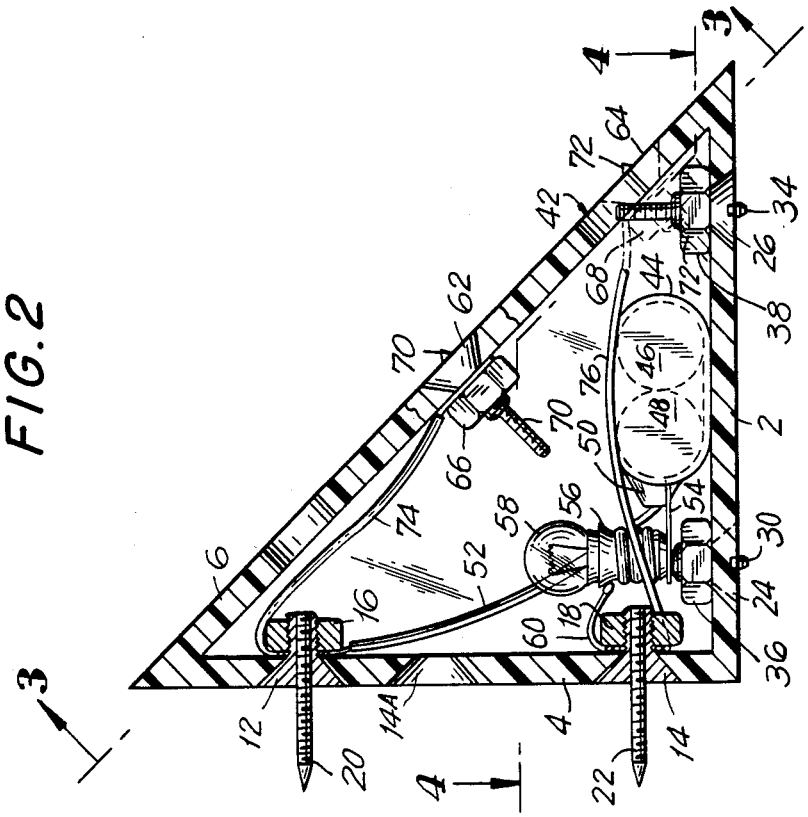
FIG. 2 shows a sectional view of the gauge of the invention taken along line 2—2 in FIG. 1.
Figure 1:
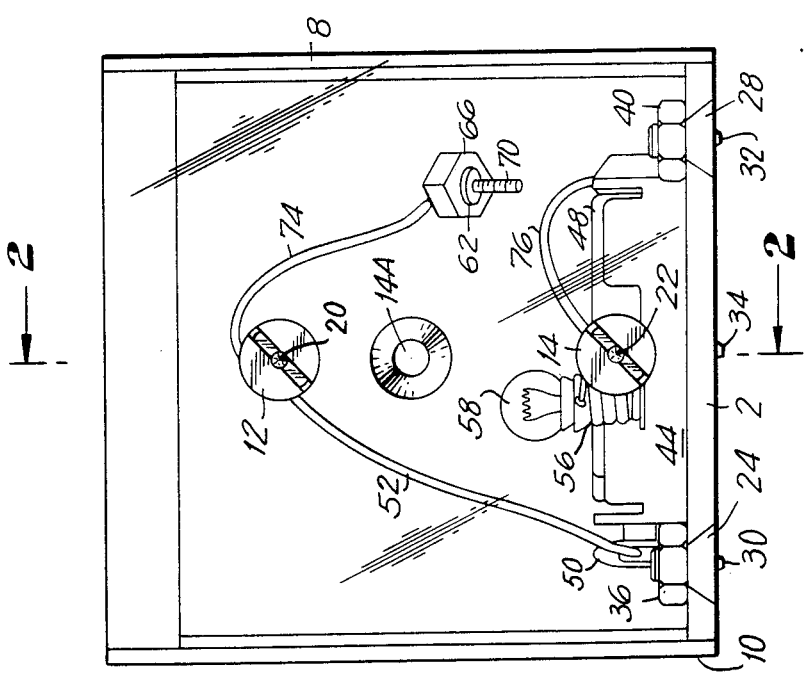
FIG. 1 shows a side view of the gauge in accordance with the present invention.

As shown in FIGS. 1 to 4, the tool gauge comprises a housing, for example made of plastic, having a bottom side 2, a vertical side 4, and a diagonal side 6. Bottom side 2 is to be placed in a predetermined orientation, preferably parallel, to the reference surface on the machine tool. Vertical side 4 preferably is connected to bottom side 2 at a first predetermined angle. That angle is an angle, such as 90°, to which it is desired to adjust or maintain a conductive element on a machine tool with respect to a reference surface. Triangular sides 8 and 10 complete the housing. Sides 2, 4, and 6 can be made of opaque material and sides 8 and 10 can be made of transparent or translucent material to permit an operator to view an indicator to be described below. Side 6 preferably is connected to bottom side 2 at a second predetermined angle. Such second predetermined angle is some oblique angle, such as 45°, to which it is desired to adjust or maintain a conductive element on a machine tool with respect to a reference surface. Sides 8 and 10 are removeable from the gauge to permit access to the electrical and mechanical components inside the gauge. Preferably, the sides 8 and 10 are held to the gauge by a screw and nut (not shown) extending through the center of the gauge from one side to the other. The corners and edges of the housing can be rounded to facilitate ease of handling.

Vertical side 4 of the housing has two circular openings into which screws 12 and 14 are fitted. Screws 12 and 14 are secured in the circular openings by nuts 16 and 18 screwed onto the threaded portions of screws 12 and 14. Screws 12 and 14 have threaded through openings formed in the center of the screws into which threaded contacts 20 and 22 are screwed. Contacts 20 and 22 are to be abutted against a conductive element when it is desired to ascertain whether such element takes on a predetermined angle, for example 90°, with respect to the reference surface on a machine tool. Contacts 20 and 22 each have pointed ends which facilitate precise contact with such cutting element. Contacts 20 and 22 each have openings for an allen wrench in the ends opposite the pointed ends to permit adjustment of the contacts. The contacts are adjusted so that they preferably extend an equal amount from side 4. As will become apparent later, the angle made by side 4 with respect to side 2, the angle made by side 2 with respect to the reference surface, and the amount by which each contact 20 and 22 is turned into screws 12 and 14 determines the desired angle of the cutting tool.

Vertical side 4 also has a circular opening 14A between the openings for screws 12 and 14. Opening 14A is provided for the purpose of measuring the angle of a conductive element too small to span contacts 20 and 22. For such conductive elements, nut 16 is removed from screw 12 and contact 20. Contact 20 and screw 12 then are removed from the opening and reassembled with nut 16 in opening 14A.

Bottom side 2 has three circular openings. Screws 24, 26, and 28 are secured in these openings by nuts 36, 38, and 40 fastened on the threaded portions of screws. Threaded members 30 and 32 protrude from the centers of screws 24 and 28 so that the line formed by the intersection of housing sides 2 and 4 preferably is parallel to the reference surface when the gauge is in position to measure the angle of the cutting element. Like contacts 20 and 22, threaded members 30 and 32 have openings for an allen wrench to permit adjustment of the extent to which they protrude from side 2.

Screw 26 has a threaded opening containing a threaded leveling member 34 with an opening for an allen wrench on the end in the interior of the gauge. The extent to which leveling member 34 protrudes from side 2 can be adjusted by turning the leveling member with an allen wrench through opening 42. Leveling member 34 is adjusted so that housing side 2 preferably is parallel to the reference surface when the gauge is placed on the machine tool.

A conventional battery holder 44 is fixed in any well-known manner, such as by double-faced sponge tape, to the interior of the housing. Battery holder 44 contains an electrical energy source which can be, for example, any two AA size cells 46 and 48 connected in series. Connector 50 electrically connects one pole of the series combination of cells 46 and 48 to contact 20 through electrical conductor 52. Conductive strip 54 connects the other pole of the series combination of cells 46 and 48 to one pole of a conventional light socket 56 holding an indicator 58 which can be any suitable incandescent light source. Any well-known form of electrically actuated indicator, such as an audible alarm or light, can be connected to the electrical energy source and used with this tool gauge. The other pole of light socket 56 is connected to contact 22 by conductor 60. Contact 20, cells 46 and 48, indicator 58, and contact 22 thus are connected in series. The series circuit is completed when a conductive element spans contact 20 and 22 as it would when the element takes on a predetermined angle with respect to the reference surface on the machine tool. The predetermined angle can be adjusted by changing the amount by which contacts 20 and 22 are turned into screws 12 and 14 or, preferably, by adjusting leveling member 34.

Circular openings also are provided on housing side 6 to allow measurement of an angle of a conductive element more oblique than can be measured by contacts 20 and 22. Such oblique angle can be, for example, 45°. Screws 62 and 64 are secured in these openings by nuts 66 and 68 on the threaded portions of the screws. Contacts 70 and 72 are located in the centers of screws 62 and 64 in the same manner as contacts 20 and 22 are located in screws 12 and 14. Like contacts 20 and 22, contacts 70 and 72 have openings for adjustment by an allen wrench. Conductors 74 and 76 electrically connect contacts 20 and 22 with contacts 70 and 72, respectively. Thus, contacts 70 and 72 are connected in series with cells 46 and 48 and indicator 58. The series circuit is completed by a conductive element spanning contacts 70 and 72 when the element takes on a second predetermined angle with respect to a reference surface on the machine tool. The predetermined angle is set by the amount by which contacts 70 and 72 are turned into screws 62 and 64, the angle of side 6 with respect to side 2, and the angle of side 2 with respect to the reference surface.

The gauge is calibrated and used as follows. First, members 30, 32, and 34 of the gauge are placed on the reference surface of the tool. A conductive machinist's square, having two sides known to accurately define a 90° angle, then is placed on the reference surface and against the sides of either contacts 20 and 22 or contacts 70 and 72. Sides 8 and 10 are removed from the gauge and members 30 and 32 then are turned with an allen wrench until both contacts 20 and 22 or both contacts 70 and 72 contact the machinist's square and energize the indicator 58. This is to insure that contacts 20 and 22 or contacts 70 and 72 are vertically oriented with respect to one another. Sides 8 and 10 then are resecured to the gauge. Next, a conductive machinist's square, having two sides known to accurately define a predetermined angle to which it is desired to adjust the conductive element, is placed on the reference surface and abutted against the pointed tips of either contacts 20 and 22 or contacts 70 and 72. Leveling member 34 then is adjusted with an allen wrench through hole 42 so that the indicator 58 is illuminated.

Another technique of calibrating the gauge is as follows. After having vertically adjusted either contacts 20 and 22 or contacts 70 and 72, as described above, a conductive machinist's square, having two sides known to accurately define the angle at which it is desired to position the conductive element, is placed up against the pointed ends of either contacts 20 and 22 or contacts 70 and 72. The contacts then are turned with an allen wrench and adjusted so that they contact the square when it is placed on the reference surface. Indicator 58 will illuminate when such condition is achieved.

After calibration, the square then is taken away and the contacts are abutted against the conductive element to be measured. If the conductive element is positioned at the predetermined angle defined by either contacts 20 and 22 or contacts 70 and 72, a series electrical circuit is completed between cells 46 and 48 and indicator 58, thus actuating the indicator 58 and indicating to the operator that the element is in its proper alignment. If the indicator 58 is not actuated, the operator knows that the element needs adjustment. The element alignment then should be adjusted until the indicator is actuated.

Figure 5:
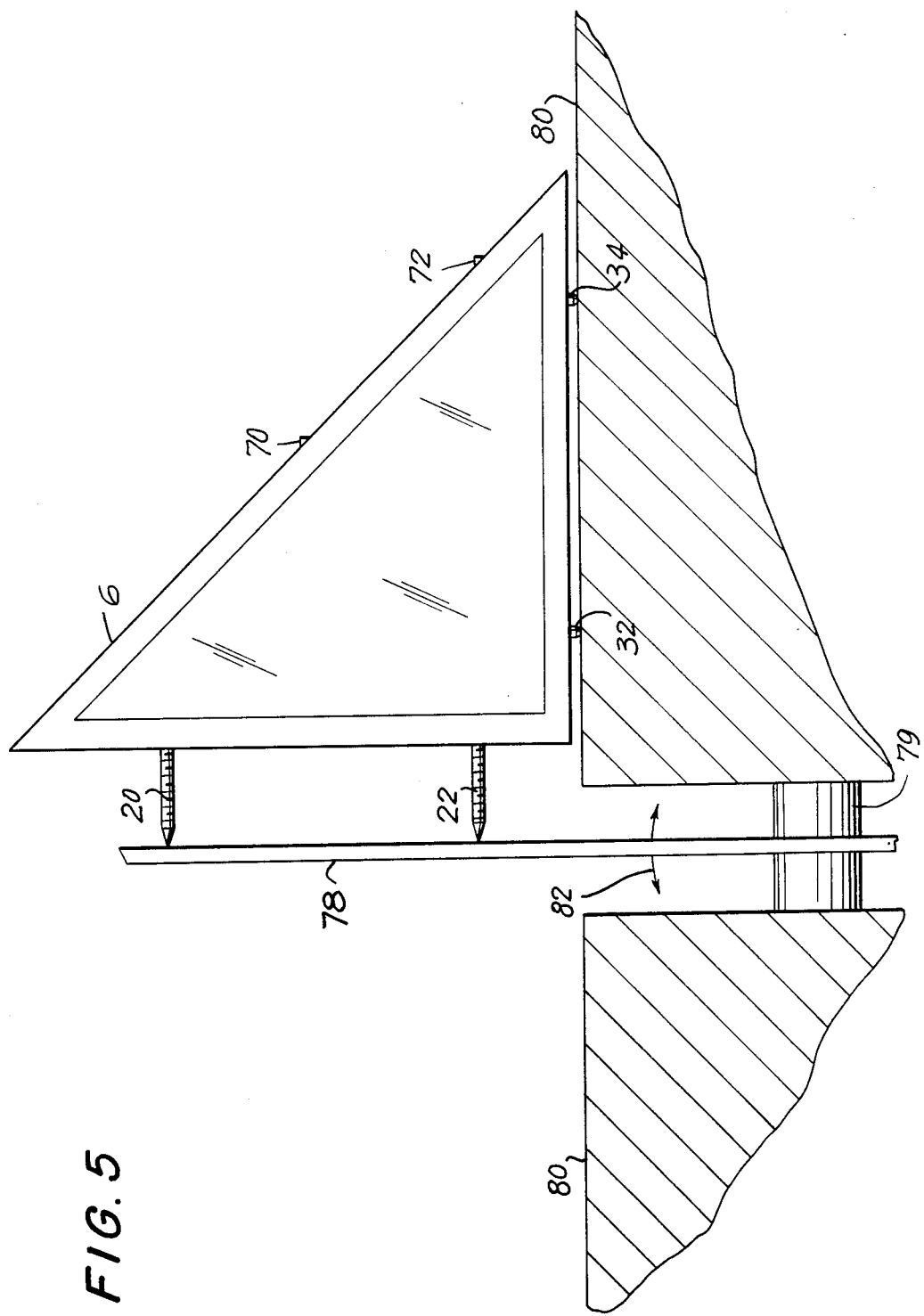
FIG. 5 shows a schematic of the gauge as it would be used to ascertain the angle of a saw blade with respect to a saw table.

FIG. 5 shows schematically the use of the gauge of the invention with a table saw, which includes a circular saw blade 78 rotatable about axis 79 with respect to a saw table 80. The saw table top is a reference surface over which a work piece is guided toward the saw blade so that the work piece is cut at a predetermined angle. The saw blade is angularly adjustable with respect to the saw table in a direction shown by arrow 82. The details of rotating and angularly adjusting the saw blade are well-known, are not a part of this invention, and are not explained further here.

The gauge first is calibrated as outlined above. The gauge then is used by placing members 30, 32, and 34 on the saw table 80. Contacts 20 and 22 then are abutted against the saw blade. If the saw blade takes on a predetermined angle as defined by contacts 20 and 22, the saw blade will complete the series circuit of the energy source and the indicator discussed above and indicate to the operator correct saw blade alignment. If the saw blade is not correctly aligned, the operator can adjust and align the saw blade until the series circuit is completed.

If the operator desires that the saw blade take on the angle defined by contacts 70 and 72, all he has to do is turn the gauge around and abut contacts 70 and 72 against the saw blade.

Further examples of tools for which the gauge of this invention is useful are as follows:

1. The gauge can be used to ascertain the angle of a radial arm saw blade with respect to the work surface;
2. The gauge can be used to ascertain the angle of a jointer fence with respect to the jointer bed to determine if the infeed and outfeed table surfaces are co-planar to one another and perpendicular, or at 45°, to the fence surface; it can also be used to determine if the fence is warped or biplanar;
3. The gauge can be used to adjust the angle of a band saw blade to the work surface, for example, at 90° or 45°;
4. The gauge can be used to ascertain the angle of a drill press table working surface with respect to a gauging rod or shaft emanating from the drill chuck;
5. The gauge can be used to ascertain the angle of a stationary disk sander work table with respect to the sanding disk;
6. The gauge can be used to ascertain the angle of a stationary or mounted hand belt sander with respect to the work surface;
7. The gauge can be used to ascertain the angle to the work surface of a shaft or gauging rod in a shaper;
8. The gauge can be used to ascertain the angle of a shaft or gauging rod in a router to the guiding base of the router or the work surface when a router is either inverted or suspended from underneath the work surface and a gauging rod or shaft protrudes through the work surface;
9. The gauge can be used to ascertain the angle of a saw blade in a hand held circular saw to the base or shoe of the saw;

10. The gauge can be used to ascertain the angle of a saber saw blade in a hand held saber saw using a plastic or plywood shoe extension;

11. The gauge can be used to ascertain the angle of a jig saw blade to the work surface of a stationary tool;

12. The gauge can be used to ascertain the angle of a horizontal belt sander or disk sander platen with respect to the work surface;

13. The gauge can be used to ascertain the angle of cut off saw blades used on single and double end tenoners; and 14. The gauge can be used to ascertain the angle of the saw blade with respect to the work surface of a beam saw.

The invention also is applicable to many other well-known tools.

It is apparent that what has been described is a gauge which is more accurate than the visual methods using a machinist's square and the like, requires a single and simple series circuit of an ordinary energy source and indicator, measures to great accuracy the angle of a conductive element with respect to a reference surface in a single operation, requires no conductive reference surfaces or supports for the conductive elements, and may be employed with perfect results by a novice.

I claim:

1. A gauge for determining whether a conductive element is oriented at a predetermined angle with respect to a reference surface on a machine tool, comprising:

a first contact;

an electrical energy source connected in series with said first contact;

an indicator connected in series with said electrical energy source and said first contact;

a second contact connected in series with said first contact, said electrical energy source, and said indicator; and a means orienting said second contact with respect to said first contact such that said conductive element closes an electrical circuit between the electrical energy source and said indicator when said gauge is placed on the reference surface and abutted against said conductive element and when said conductive element is oriented at a first predetermined angle with respect to said reference surface.

2. The gauge of claim 1, wherein said conductive element is a conductive cutting element.

3. The gauge of claim 2, wherein said conductive cutting element is a saw blade and said reference surface is a saw table adjacent said saw blade.

4. The gauge of claim 1, wherein said conductive element is a fence.

5. The gauge of claim 1, further comprising a housing supporting said first and second contacts and enclosing said electrical energy source and said indicator.

6. The guage of claim 5, further comprising a means for leveling the housing with respect to said reference surface.

7. The gauge of claim 5, wherein said housing has at least first and second sides, said guage having a means for leveling said first side with respect to said reference surface, said second side being fixed to said first side at said first predetermined angle and supporting said first and second contacts.

8. The gauge of claim 1, further comprising:

a third contact connected in series with said electrical energy source and said indicator;

a fourth contact connected in series with said third contact, said electrical energy source, and said indicator; and a means orienting said fourth contact with respect to said third contact such that said conductive element closes an electrical circuit between said electrical energy source and said indicator when said gauge is placed on the reference surface and abutted against said conductive element and when said conductive element is oriented at a second predetermined angle with respect to said reference surface.

9. The gauge of claim 8, further comprising a housing supporting said first, second, third, and fourth contacts and enclosing said electrical energy source and said indicator.

10. The gauge of claim 9, further comprising a means for leveling the housing with respect to said reference surface.

11. The gauge of claim 9, wherein said housing has at least first, second, and third sides, said gauge having a means for leveling said first side with respect to said reference surface, said second side being fixed to said first side at said first predetermined angle and supporting said first and second contacts, and said third side being fixed to said first side at said second predetermined angle and supporting said third and fourth contacts.

12. A method for determining whether a conductive element is oriented at a predetermined angle with respect to a reference surface on a machine tool comprising the steps of:

placing the gauge of claim 1 on the reference surface, and abutting the gauge against the conductive element to close an electrical circuit between the conductive element, the electrical energy source, and the indicator when the conductive element is at a first predetermined angle with respect to the reference surface.

13. The method of claim 12, further comprising the step of:

calibrating the gauge between the placing and abutting steps.

* * * * *